United States Patent [19]

Shinkai et al.

[11] 4,259,687
[45] Mar. 31, 1981

[54] BEAM INDEX COLOR CATHODE RAY TUBE

[75] Inventors: Kinya Shinkai, Yokohama; Susumu Akazawa, Sakura; Kiyonori Tominaga, Tokyo, all of Japan

[73] Assignee: Sony Corporation, Tokyo, Japan

[21] Appl. No.: 96,374

[22] Filed: Nov. 21, 1979

[30] Foreign Application Priority Data

Nov. 24, 1978 [JP] Japan .................................. 53-145684
Nov. 28, 1978 [JP] Japan .................................. 53-146835
Nov. 29, 1978 [JP] Japan .................................. 53-148069

[51] Int. Cl.³ .............................................. H04N 9/22
[52] U.S. Cl. ........................................ 358/67; 358/69
[58] Field of Search ....................... 358/66, 67, 68, 69, 358/70; 313/470, 471

[56] References Cited

U.S. PATENT DOCUMENTS

| 3,098,896 | 7/1963 | Lynch ..................................... 358/67 |
| 3,305,628 | 2/1967 | Kitamura ............................... 358/67 |
| 3,875,450 | 4/1975 | Thompson ............................. 358/67 |

FOREIGN PATENT DOCUMENTS

1370426 10/1974 United Kingdom ...................... 358/67

*Primary Examiner*—Robert L. Griffin
*Assistant Examiner*—Michael Allen Masinick
*Attorney, Agent, or Firm*—Lewis H. Eslinger; Alvin Sinderbrand

[57] ABSTRACT

In a beam index color television receiver having the screen of its color cathode ray tube provided with a repetitive pattern of a plurality of groups of different primary color phosphor elements arranged side-by-side across the image area of the screen to be scanned by a single electron beam as the latter is selectively modulated by respective color signals, index and mode set signals are provided in response to scanning by the beam of respective locations on the screen which are interspersed across the latter with distances therebetween which are non-integrally different from the pitch of the groups of color phosphor elements, and with adjacent locations corresponding to the mode set signal being spaced apart by an integral multiple of such pitch. The index signal can be provided by the scanning with the beam of index elements at the corresponding locations on the screen which emit light or other radiant energy, while the mode set signal may be provided in response to the absence of the index elements at the respective locations or to the presence, at the latter locations, of mode set elements which emit distinctive radiations when scanned by the beam. In any case, a gate pulse generator is responsive to the index signal to provide sequentially repeated gating signals by which the color signals are gated to selectively modulate the electron beam, and the phase and sequence of the gating signals are controlled in response to the mode set signal for ensuring that, as the beam scans each color phosphor element, the beam is modulated by the corresponding color signal.

16 Claims, 87 Drawing Figures

| | |
|---|---|
| FIG. 8A | (S_P)  |
| FIG. 8B | (S_PX) |
| FIG. 8C | (S_I) |
| FIG. 8D | (S_Y) |
| FIG. 8E | (S_C) |
| FIG. 8F | (P_M) |
| FIG. 8G | (P_N) |
| FIG. 8H | (P_O) |
| FIG. 8I | (P_Q) |
| FIG. 8J | (P_S) |
| FIG. 8K | (P_L) |
| FIG. 8L | (M_X) |
| FIG. 8M | (M_Y) |
| FIG. 8N | (A_R) |
| FIG. 8O | (A_G) |
| FIG. 8P | (A_B) |
| FIG. 8Q | (C_R) |
| FIG. 8R | (C_G) |
| FIG. 8S | (C_B) |
| FIG. 8T | (D_R) |
| FIG. 8U | (D_G) |
| FIG. 8V | (D_B) |
| FIG. 8W | (F_R) |
| FIG. 8X | (F_G) |
| FIG. 8Y | (F_B) |

BEAM INDEX COLOR CATHODE RAY TUBE

BACKGROUND OF THE INVENTION

1. Field of the Invention

This invention relates generally to color television receivers, and more particularly is directed to improvements in color television receivers of the beam index type.

2. Description of the Prior Art

In existing beam index color television receivers, a single electron beam scans the screen of a color cathode ray tube which, in its image or effective picture area, is provided with triads of red, green and blue color phosphor stripes extending vertically and being sequentially repeated in the horizontal scanning direction. The screen also has, on its inner surface, index phosphor stripes or elements which are spaced apart in the horizontal scanning direction in predetermined positional relation to the triads of color phosphor stripes. The index phosphor stripes emit radiant energy when excited by the scanning beam to cause a photodetector or the like to produce a corresponding index signal which is employed to control the gating or switching of the color signals for modulating the intensity or density of the electron beam. Thus, by employing the index signal, the electron beam can be density-modulated or have its beam current determined by the red, green and blue primary color signals at precisely the points where the single electron beam scans the color phosphor stripes which emit red, green and blue light, respectively.

In one conventional method of arranging the index phosphor stripes or elements, three index stripes are formed for every two sets or groups of red, green and blue color phosphor stripes so that the distance between adjacent index phosphor stripes is less than the pitch of each set or group of the color phosphor stripes. Although this conventional method has the advantage that the phase of the index signal is not displaced in response to the colors to be reproduced, it has the drawback that the index phosphor stripes are not located adjacent to known ones of the triads of color phosphor stripes. Accordingly, when a pulse having a triplet frequency is formed by multiplying the frequency of the index signal by three or, in the case of frequency division of the pulse in order to form three phase gating pulses adapted to gate the color signals for modulating the single electron beam, special circuitry must be employed for setting the mode of the gating pulses. The circuitry provides the respective gating pulses when the electron beam scans the color phosphor stripes in order to insure that the beam is properly modulated when it scans each color phosphor element or stripe.

One conventional method of setting the mode involves also arranging index phosphor elements on the run-in area located at one side of the effective picture or image area of the cathode ray tube and counting the index phosphor elements in the run-in area in order to set the mode, that is, phase and sequence of the three phase gating pulses at the beginning of each horizontal scan of the image area. However, this method has the possible drawback that if, during scanning of the image area, the video signal is at the black level so that no beam current flows, there will not be any index signal generated. This drawback is more fully explained in U.S. Patent Application Ser. No. 78,206, filed Sept. 24, 1979 and having a common assignee herewith, and which provides a means for preventing the picture tube from being subjected to this cut-off irrespective of the contents of the received video signal. However, the methodology and circuitry therein disclosed envisions positively establishing a minimum beam current by which the production of an adequate index signal is insured, irrespective of the contents of the received video signal when scanning the image area of the screen. This minimum beam current results in the black level of the video signal becoming higher or brighter, thereby undesirably reducing the contrast between the black or dark portions of the reproduced image and the color or relatively bright portions thereof.

OBJECTS AND SUMMARY OF THE INVENTION

Accordingly, it is an object of the present invention to provide a beam index color television receiver which avoids the above problems in a relatively simple manner.

Another object of the invention is to provide a beam index color television receiver with a color cathode ray tube which is arranged to provide index and mode set signals in response to scanning of its screen by the electron beam, and in which such index and mode set signals are employed to ensure accurate selection or gating of the color signals for modulating the beam as the latter scans the color phosphor elements of the screen.

A further object is to provide a beam index color television receiver, as aforesaid, in which the accurate selection or gating of the color signals is maintained even if the video signal being received is at the black level during scanning of the image area of the screen.

A still further object is to provide a beam index color television receiver, as aforesaid, in which accurate selection or gating of the color signals is maintained without unduly decreasing the contrast of the displayed image.

In accordance with an aspect of the invention, a color televisin receiver of the beam index type comprises a cathode ray tube having a screen composed of groups of color phosphor elements arranged side-by-side to have a predetermined pitch in a repetitive pattern across an image area of the screen with each of the color phosphor elements of each group emitting light of a respective color different from the color of light emitted by each of the other elements of the respective group when excited by an electron beam, and gun means providing an electron beam scanning across the screen during scanning intervals to excite the color phosphor elements in succession and adapted to modulate the density of the electron beam in accordance with a received color signal; means responsive to the electron beam scanning across the screen to provide index and mode set signals at respective locations of said beam on said screen which are interspersed across the latter with said locations being uniformly spaced from each other by a distance non-integrally different from said predetermined pitch and with adjacent locations corresponding to said mode set signal being spaced apart by an integral multiple of said pitch; gating means receiving color signals corresponding to said color phosphor elements, respectively, and being controllable for determining which of said color signals is received by said gun means for modulating said electron beam; gate pulse generating means responsive to said index signal for providing sequentially repeated gating signals to said gating means at a frequency corresponding to that with which the beam scans the groups of color phosphor elements; and mode set means responsive to said mode set signal to control the mode, that is, the phase and sequence of said gating signals.

The above, and other objects, features and advantages of the invention, will be apparent in the following detailed description of certain illustrative embodiments which are to be read in conjunction with the accompanying drawings.

BRIEF DESCRIPTION OF THE DRAWINGS

FIGS. 2A through 2R are wave form diagrams to which reference will be made in explaining the operation of the beam index color cathode ray tube and associated circuitry;

FIG. 5 is a view similar to that of FIG. 2, and FIGS. 5A through 5Y are further wave form diagrams to which reference will be made in explaining the operation of the beam index color television receiver of FIG. 3;

FIG. 13 is a view similar to FIGS. 2 and 5, and FIGS. 13A through 13F are wave form diagrams to which reference will be made in explaining the operation of the embodiment of FIG. 12.

DESCRIPTION OF PREFERRED EMBODIMENTS

Figures 1, 2:
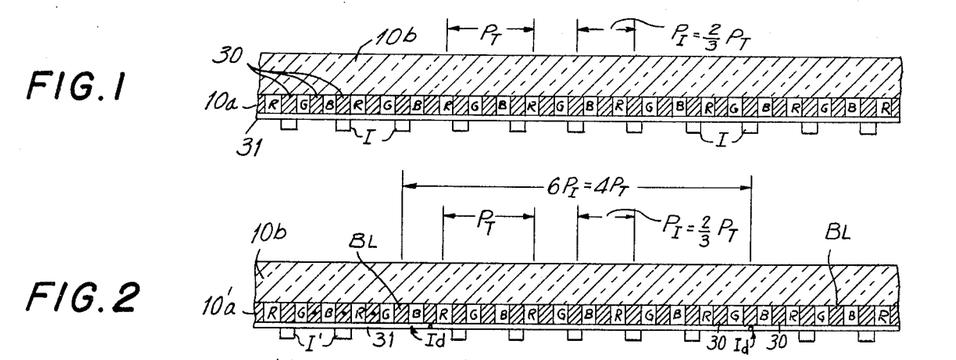
FIG. 1 schematically illustrates a portion of the cross-section of a screen of a beam index color cathode ray tube with index phosphor stripes formed on the inner surface in a conventional manner.
FIG. 2 is a view similar to that of FIG. 1, but illustrating a portion of the cross-section of a screen of a beam index color cathode ray tube according to an embodiment of the present invention.

Referring to the drawings in detail, and initially to FIG. 1 thereof, it will be seen that a beam index color cathode ray tube 10 conventionally comprises a screen 10a formed on the inner surface of the glass or other transparent face plate or panel 10b of the tube envelope, so as to be scanned by an electron beam 11 (FIG. 3) issuing from a gun structure 11a in the neck of the tube envelope. As shown in FIG. 1, screen 10a of beam index color cathode ray tube 10 is conventionally comprised of vertically arranged parallel triads of red, green and blue color phosphor elements or stripes, R, G and B which are repeated sequentially in the horizontal scanning direction across the image area of screen 10a. A layer 30 of a suitable black material, such as carbon or the like, is coated on the inner surface of the face plate 10b of tube 10 between adjacent color phosphor stripes R, G and B. A metallic back layer 31, for example, of aluminum, is thinly coated by vapor deposition or similar technique, over the entire rear surface of screen 10a so as to be effective as a light reflector while being substantially transparent to electrons. Thus, electron beam 11 can penetrate back layer 31 to excite color phosphor stripes R, G and B, while light emitted from the color phosphor stripes as a result of such excitation is, for the most part, reflected forward through face plate 10b towards the viewer rather than being directed into color cathode ray tube 10.

In a conventional arrangement, such as is illustrated in FIG. 1, the pitch or lateral distance occupied by each of the triads of red, green and blue color phosphor elements R, G and B is $P_T$, and index phosphor stripes or elements I extend vertically on the back surface of metallic layer 31 at locations which are spaced horizontally across screen 10a. The pitch $P_I$ or the distance between adjacent index phosphor stripes or elements I is non-integrally different from the pitch $P_T$, for example, is equal to two-thirds of the pitch $P_T$ of each set or triad of color phosphor elements R, G and B. Accordingly, in the conventional method of arranging index phosphor stripes I, three index elements I are provided for each two sets of color phosphor elements R, G and B, that is, pitch $P_I$ of adjacent index phosphor stripes I is less than pitch $P_T$ of the sets of color phosphor stripes R, G and B. By reason of the foregoing, the successive index phoshpor stripes I are not in the same positional relation to the color phosphor stripes R, G, B of the successive triads. Therefore, an index signal which results from beam scanning of the index phosphor stripes I cannot be relied upon alone to indicate the position of the beam relative to the color phosphor stripes. In other words, such index signal cannot set the mode, that is, the sequence and phase, of sequences of gating signals which are generated to control the modulation of the beam by respective color signals as the beam scans the corresponding color phosphor stripes.

In accordance with the present invention, for example, as illustrated on FIG. 2, scanning of an electron beam across the screen 10'a is relied upon to provide index and mode set signals at respective locations of the beam on the screen which are interspersed across the latter, for example, as at I' and $I_d$, with such locations being uniformly spaced from each other by the distance $P_I$ which is non-integrally different from the pitch $P_T$ of the triads of color phosphor elements R, G, B, and with the adjacent locations $I_d$ corresponding to the mode set signal being spaced apart by an integral multiple of the pitch $P_T$.

More particularly, in the embodiment of FIG. 2, the distance $P_I$ is two-thirds of the pitch $P_T$, and the adjacent locations $I_d$ corresponding to the mode set signal are spaced apart by six times $P_I$, that is, four times $P_T$. By reason of the foregoing, each location $I_d$ is in a predetermined relation to an adjacent triad of color phosphor elements R, G, B, for example, each location $I_d$ is disposed between color phosphor stripes or elements G and B, as shown on FIG. 2.

In the embodiment of the invention shown on FIG. 2, the means to provide the index and mode set signals includes index elements I' disposed on the screen $10'a$ at said locations corresponding to the index signal and being absent from the screen at said locations $I_d$ corresponding to said mode set signal. When the index elements I' are excited by an electron beam scanning the respective locations, radiant energy is emitted therefrom and may be detected, as hereinafter described. In that case, the index signal for controlling the generation of the sequences of gating signals may be provided in response to the detection of the radiant energy pulses emitted as the beam scans the location of index elements I', while the mode set signal for determining the mode or sequence and phase of the gating signals is provided in response to the absence of radiant energy being emitted as the beam scans the locations $I_d$. Thus, gating signals for determining the modulation of the electron beam by the color signals may be provided to ensure the proper excitation of respective red, green and blue color phosphor stripes, R, G, and B.

Figure 2:
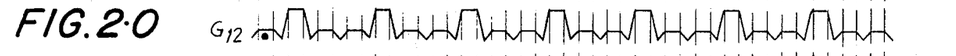
Figures 2A, 2B:
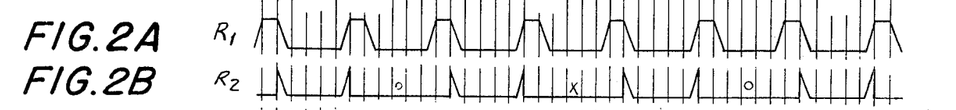

However, the use of the foregoing measures to obtain the gating signals or pulses for gating the red, green and blue color signals when the beam scans the red, green and blue color phosphor stripes will not ensure the reliable detection of the locations $I_d$ corresponding to the mode set signal. More particularly, with the arrangement of index elements or phosphor stripes I' as shown on FIG. 2, it is possible to obtain a false indication of a location $I_d$, and hence and erroneous mode set signal, in the event that the color signals applied for modulating the electron beam correspond to a monochrome, that is, a red, blue or green image. If, for example, a red image is to be displayed, the cathode current is generally as indicated at $R_1$ on FIG. 2A, so as to provide beam current only during scanning of the red phosphor stripes R and immediately before and after such scanning. In other words, there would be no beam current during the scanning of the green and blue phoshpor stripes G and B. Disregarding residual light, a photodetector 20 (FIG. 3) senses the excitation of index phosphor stripes I' and generates a corresponding output signal $R_2$ (FIG. 2B). At the positions or locations, $I_d$ from which index elements I' are absent, there will be no radiant emission noted by photodetector 20 and accordingly no output signal $R_2$, as noted by the designation o on FIG. 2B. Further, in each case where an index phosphor stripe I' falls between green and blue color phosphor stripes G and B, such index stripe I' will not be excited by electron beam having cathode current $R_1$. Accordingly, no output signal $R_2$ will be generated by photodetector 20 at such locations as noted at x on FIG. 2B.

Figure 2C:
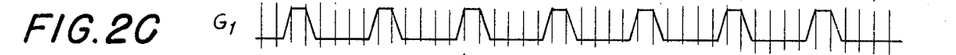
Figure 2D:
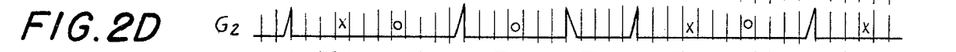
Figure 2E:
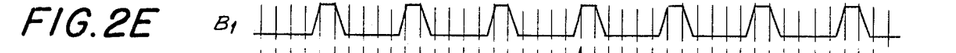
Figure 2F:
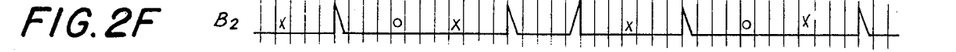

In a similar manner, if the electron beam is being modulated to display a green image, then a cathode or beam current exists only during, and immediately before and after, the scanning of each green color phosphor stripe G, as indicated by the wave form $G_1$ on FIG. 2C. In that case, the photodetector 20 of FIG. 3 will provide the output $G_2$ shown on FIG. 2D, that is, there will be an index signal or pulse from the photodetector only when the electron beam scans one of the index elements I' which is immediately adjacent a green color phosphor stripe G. Thus, as indicated by the notations o on FIG. 2D, there will be no output from the photodetector during the scanning of each location $I_d$ from which an index element I' is absent. However, as indicated by the notations x on FIG. 2D, there will also be no output from the photodetector when the electron beam scans those index elements I' which are located between blue and red color phosphor stripes B and R. Similarly, when the electron beam is being modulated to display a blue image, there is a cathode or beam current only during, and immediately before and after, the scanning of each blue color phosphor stripe B, as indicated by the wave form $B_1$ on FIG. 2E. Thus, the output of the photodetector indicated at $B_2$ on FIG. 2E will provide an index signal or pulse only when the beam scans an index element I' which is immediately adjacent a blue color phosphor stripe B. By reason of the foregoing, the output $B_2$ of the photodetector will be devoid of any index signal or pulse at each location $I_d$ from which an index element I' is absent, as indicated by the notations o on FIG. 2F, and also at each location where the electron beam scans an index element I' located between red and green color phosphor stripes R and G, as indicated by the notations x on FIG. 2F.

By reason of the foregoing, the absence of any output from the photodetector provided to respond to radiant emissions from index elements I' may indicate either that the electron beam is then scanning a location $I_d$ from which the index element is absent, or that the electron beam is scanning an index element I' situated between two color phosphor stripes which are not being excited by the electron beam during the respective scanning interval. Because of such possible ambiguity in the meaning of the output from the photodetector, the absence of output from the photodetector may not be relied upon to surely indicate the locations $I_d$ for forming a desired mode set signal. However, in accordance with the present invention, a gate pulse generator is provided which comprises means for generating the sequences of main gating pulses corresponding to the primary color signals, respectively, and intended to gate the respective color signals as the electron beam scans the color phosphor stripes or elements R, G and B, and, in addition thereto, means generating sequences of auxiliary gating pulses respectively corresponding to the sequences of main gating pulses and occurring intermediate the latter so as to there provide beam currents for avoiding false indications of the absence of the index elements I' at a time when a monochrome image is being displayed.

Figures 3, 4, 6, 7:
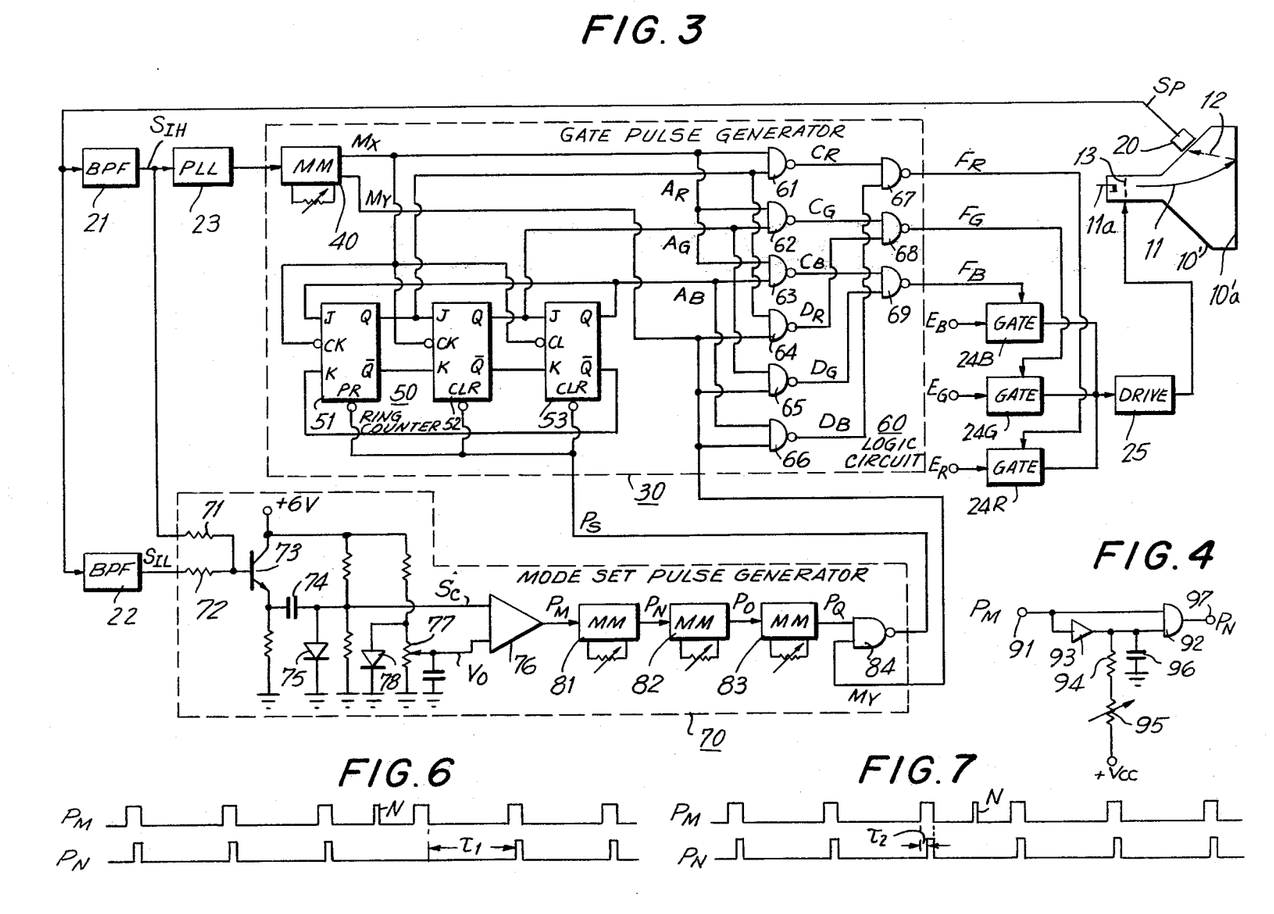
FIG. 3 is a schematic block diagram illustrating circuits of a beam index color television receiver according to the invention using a color cathode ray tube of the configuration shown on FIG. 2.
FIG. 4 is a circuit diagram showing a modification of the embodiment illustrated by FIG. 3.
FIG. 6 is a wave form diagram illustrating triggering pulses supplied to a monostable multivibrator in the circuit of FIG. 3.
FIG. 7 is a wave form diagram illustrating pulses obtained with the modified circuit of FIG. 4.

Referring now to FIG. 3, it will be seen that, in an index beam color television receiver according to this invention and having a screen $10'a$ of the configuration shown on FIG. 2, radiant energy 12 emitted by each of the index elements I' when scanned by the electron beam 11 so long as the beam current is above the black level is sensed by the photodetector 20 to provide an output signal $S_P$ (FIG. 5A) supplied to a band pass filter 21 having a high Q. The output of band pass filter 21 constitutes an index signal $S_{IH}$ (FIG. 5C) which is supplied to a phase-locked loop (PLL) circuit 23 of conventional design which, in turn, provides a signal $P_L$ (FIG. 5K) synchronized with index signal $S_{IH}$ and having a frequency twice that of the latter.

The frequency of index signal $S_{IH}$ is, of course, a function of the pitch or distance $P_I$ between the index phosphor stripes I', and also a function of the speed or rate at which the electron beam is made to scan across the image area of screen $10'a$. Since the distance or pitch $P_I$ is two-thirds of the pitch $P_T$ of the triads of color phosphor stripes R, G and B in the embodiment shown on FIG. 2, it will be appreciated that the frequency of index signal $S_{IH}$ is one and one-half times the so-called triplet frequency, that is, the frequency with which the electron beam scans the triads or sets of color phosphor stripes R, G and B. Therefore, the frequency of signal $P_L$ from PLL circuit 23 is three times the triplet frequency. Further, as shown on FIG. 5K, the output signal $P_L$ from PLL circuit 23 has a duty factor of one-half, that is, such signal is essentially a square wave providing a relatively high output for one-half of each cycle and a low output for the remaining half of each cycle.

The above-described signal $P_L$ from PLL circuit 23 is supplied to a gate pulse generator 30 which is shown to comprise a monostable multivibrator 40, a ring counter 50 composed of three stages of JK-flip-flop circuits 51, 52 and 53, and a logic circuit 60 composed of NAND gates 61 to 69. The monostable multivibrator 40 is operative, in response to signal $P_L$ from circuit 23, to provide a signal $M_X$ (FIG. 5L) of the same frequency as signal $P_L$, but having a duty factor larger than one-half, and monostable multivibrator 40 further provides a signal $M_Y$ (FIG. 5M) which is the inverse or complement of signal $M_X$, that is, which has a duty cycle less than one-half. The signal $M_X$ is applied to clock inputs CK of flip-flop circuits 51, 52 and 53 which function to divide the frequency of signal $M_X$ by three and to provide, at their outputs Q, signals $A_R$, $A_G$ and $A_B$, respectively, which are displaced from each other, in phase, by 120° (FIGS. 5N, 5O and 5P), and which each have a frequency equal to the triplet frequency.

In the embodiment of the invention being described with reference to FIG. 3, a mode set pulse $P_S$ (FIG. 5J), provided in a manner hereinafter described in detail, is applied to a preset input PR of flip-flop circuit 51 and to clear inputs CLR of flip-flop circuits 52 and 53. Such mode set pulse $P_S$, when applied to flip-flop circuits 51, 52 and 53 of ring counter 50, ensures that the signals $A_R$, $A_G$ and $A_B$ thereafter occur in a sequence and relative phase relationship in which such signals $A_R$, $A_G$ and $A_B$ achieve a high logic level "1" as electron beam 11 is scanning the red, green and blue color phosphor stripes R, G and B, respectively, as is apparent from a comparison of FIG. 5N, 5O and 5P with FIG. 5.

Figure 5:
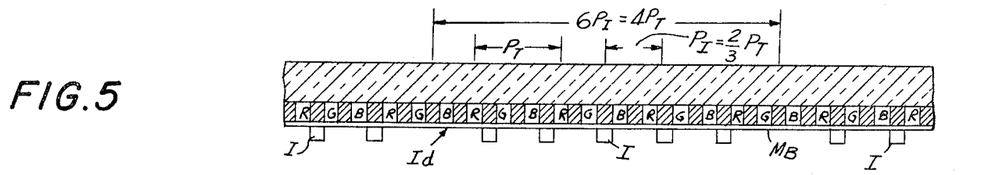
Figure 5A:
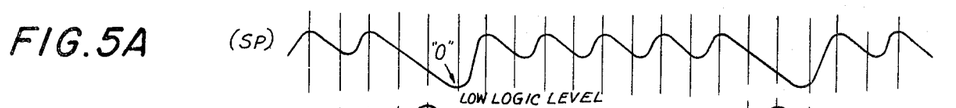
Figure 5B:
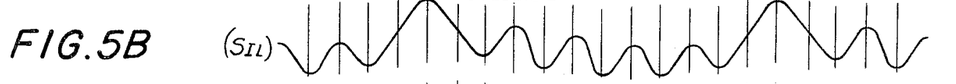
Figures 5C, 5D:
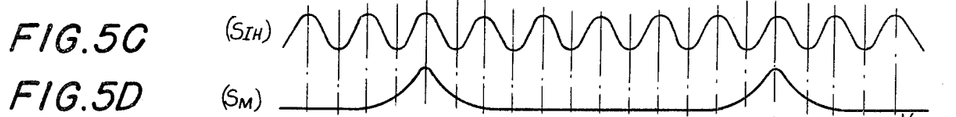
Figure 5E:
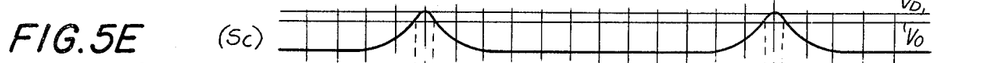
Figure 5F:
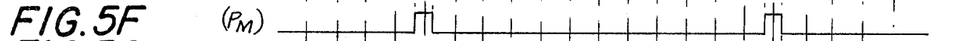
Figure 5G:
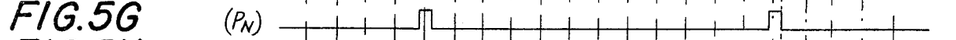
Figure 5H:
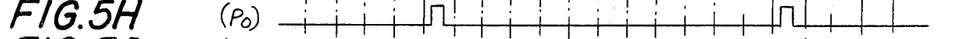
Figures 5I, 5J:
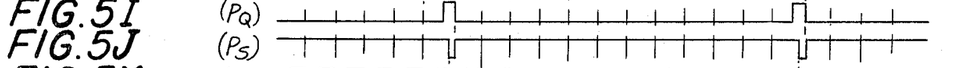

Signals $A_R$, $A_G$ and $A_B$ provided by flip-flop circuits 51, 52 and 53, respectively, are applied to first inputs of NAND gates 61, 62 and 63, respectively, while signal $M_X$ is supplied to second inputs of NAND gates 61, 62 and 63. The resultant output pulses from NAND gates 61, 62 and 63 are pulse signals $C_R$, $C_G$ and $C_B$, respectively, as illustrated in FIG. 5Q, 5R and 5S.

Figures 5K, 5L, 5M:
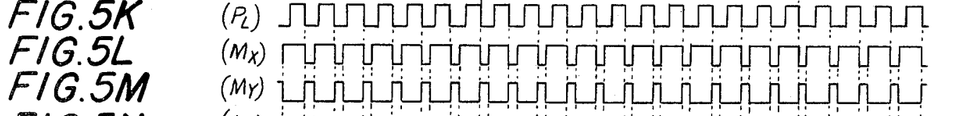
Figures 5N, 5O, 5P:
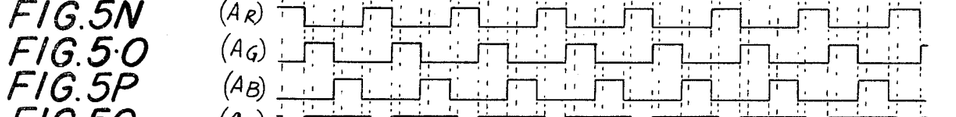
Figures 5Q, 5R:
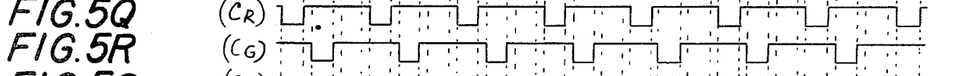
Figures 5S, 5T:
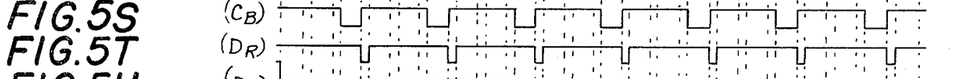
Figures 5U, 5V:
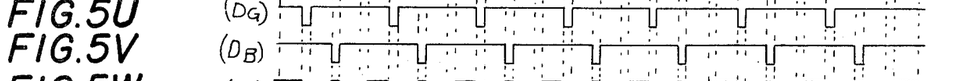
Figures 5W, 5X, 5Y:
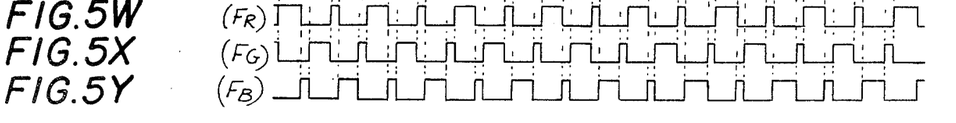

Signals $A_R$, $A_G$ and $A_B$ are also applied to first inputs of NAND gates 64, 65 and 66, respectively, while inverse signal $M_Y$, illustrated by FIG. 5M, is supplied to second inputs of NAND gates 64, 65 and 66. The resulting pulse signals $D_R$, $D_G$ and $D_B$, are best illustrated in FIGS. 5T, 5U and 5V. The signals are then paired, such that pulse signals $C_R$ and $D_B$ are supplied to NAND gate 67, pulse signals $C_G$ and $D_R$ are supplied to NAND gate 68, and pulse signals $C_B$ and $D_G$ are supplied to NAND gate 69. The outputs from NAND gates 67, 68 and 69 are pulse or gating signals $F_R$, $F_G$ and $F_B$, respectively. Gating signals $F_R$, $F_G$ and $F_B$ are made up of main gating pulses which attain a logic level "1" at the positions of red, green and blue color phosphor elements R, G and B, respectively, and auxiliary gating pulses midway between the respective main gating pulses, as shown in FIGS. 5W, 5X and 5Y, respectively. The sequentially repeating gating signals $F_R$, $F_G$ and $F_B$ function to determine the modulation of electron beam 11 by the red, green and blue color signals. In particular, gating signals $F_R$, $F_G$ and $F_B$ are applied to gate circuits $24_R$, $24_G$ and $24_B$, respectively, which sequentially and repetitively gate the respective red, green and blue color signals $E_R$, $E_G$ and $E_B$, in succession. Thus, electron beam 11 is modulated with red color signal $E_R$ when the latter is passed through the respective gate circuit $24_R$ and a drive circuit 25 to a first grid 13 as electron beam 11 scans a red color phosphor stripe R, whereas green and blue color signals, $E_G$ and $E_B$, which are gated by circuits $24_G$ and $24_B$, respectively, are supplied through drive circuit 25 to grid 13 when the modulated electron beam scans green and blue color phosphor stripes G and B, respectively.

By reason of the auxiliary gating pulses also included in gating signals $F_R$, $F_G$ and $F_B$ midway between the respective main gating pulses, the cathode or beam current is also raised substantially above the black level in response to each such auxiliary gating pulse, for example, as indicated by the wave forms $R_{11}$, $G_{11}$ and $B_{11}$ (FIGS. 2G, 2I and 2K), when the beam scans the spaces between the color phosphor stripes R, G and B. By providing beam current when the beam is scanning the spaces between color phosphor stripes R, G and B, reliable detection of the locations $I_d$ at which index elements are omitted from screen $10'a$ is achieved, even when a monochrome, for example, red, green or blue image is being displayed. For example, when displaying a red image, the output of photodetector 20 schematically represented at $R_{21}$ (FIG. 2H) indicates the presence of the index elements I' which are next to the color phosphor stripes R and also the presence of the index elements I' which are between the color phosphor stripes G and B. Similarly, when displaying a green image, the output of photodetector 20 schematically represented at $G_{21}$ (FIG. 2J) indicates the presence of the index elements I' next to color phosphor stripes G and also of the index elements I' which are between the color phosphor stripes R and B. Finally, when displaying a blue image, the output of photodetector 20 schematically represented at $B_{21}$ (FIG. 2L) indicates the presence of the index elements I' which are next to color phosphor stripes B and also of the index elements I' which are between the color phosphor stripes G and R. Accordingly, in all cases, the output of photodetector 20 accurately indicates the locations $I_d$ from which the index elements are absent, for example, as noted at "0" on FIGS. 2H, 2J and 2L.

As shown in greater detail on FIG. 5A, as electron beam 11 scans screen $10'a$ in the beam index color television receiver according to this invention, the output signal $S_P$ generated by photodetector 20 rises to a peak as electron beam 11 scans an index phosphor stripe I'. The residual light detected by photodetector 20 declines to a value which reflects the residual excitation from index phosphor stripe I'. As the next index phosphor stripe I' is scanned, output signal $S_P$ of photodetector 20 again rises to a peak in response to the excitation of such next index phosphor stripe I'. As electron beam 11 continues its scan and encounters a location $I_d$ from which index element or stripe I' is absent, the residual light decreases to a value which is equivalent to a low logic level "0". That logic level "0" forms a valley in the output of the photodetector which indicates precisely the location $I_d$ of an absent index phosphor stripe.

By reason of the high Q of band pass filter 21, the index signal $S_{IH}$ obtained at the output of filter 21 is a uniform pulsing signal (FIG. 5C) devoid of the valleys present in output $S_P$ of photodetector 20 for indicating the locations $I_d$. Output signal $S_P$ is also delivered from photodetector 20 to a second band pass filter 22 (FIG. 3) having a low Q. The resultant output signal from low Q band pass filter 22 is a signal $S_{IL}$ (FIG. 5B) in which there is a peak at each location $I_d$ where an index phosphor stripe I' is absent and valleys exist at the positions where index phosphor stripes I are present. In other words, signal $S_{IL}$ is approximately the inverse of signal $S_P$.

Index signal $S_{IH}$ provided by the first band pass filter 21 and signal $S_{IL}$ generated by second band pass filter 22 are applied to a mode set pulse generator 70 in which index signal $S_{IH}$ is passed through a first resistor 71 while signal $S_{IL}$ is passed through a second resistor 72. The two resultant signals are summed and supplied to the base of an emitter follower transistor 73. As is best illustrated in FIG. 5D, the summation of the wave forms of signals $S_{IL}$ and $S_{IH}$ forms a signal $S_M$ with a peak or pulse corresponding to each location $I_d$ on screen 10'a from which an index element I' is absent. In the illustrated example, such signal $S_M$ has a frequency which is one-quarter of the triplet frequency at which the triads of color phosphor stripes are scanned.

Signal $S_M$ is applied through emitter follower transistor 73 and a capacitor 74 to a clamping diode 75. The signal $S_C$ (FIG. 5E) derived at clamping diode 75 has a peak which is clamped to a constant potential $V_D$. Signal $S_C$ is then applied to one input of a comparison amplifier 76. A reference voltage $V_o$ derived at the movable contact arm of a variable resistor 77 is slightly lower than the forward voltage of a diode 78 which is connected in parallel with variable resistor 77, and such voltage $V_o$ is applied to another input of comparison amplifier 76 and serves as a reference voltage for the comparison amplifier. Thus, the amplitude of signal $S_C$ is compared to the amplitude of voltage $V_o$ which is selected to be exceeded by signal $S_C$, as at $V_D$, only in correspondence to the locations $I_d$ from which the index elements I' are absent (FIG. 5E). When the amplitude of signal $S_C$ exceeds voltage $V_o$, a pulse $P_M$ is produced such that the pulse achieves a high logic level of "1" and maintains that logic level until signal $S_C$ becomes less than voltage $V_o$, at which time signal $P_M$ decreases to the logic level "0" (FIG. 5F).

Pulse $P_M$ is applied to a monostable multivibrator 81 (FIG. 3) to generate a pulse $P_N$ (FIG. 5G) of negative polarity which is triggered at the trailing or downgoing edge of pulse $P_M$. As is particularly shown on FIG. 6, the duration $\tau$ of the negative polarity pulse $P_N$ is slightly shorter than the period of the pulse $P_M$. By reason of the foregoing, the monostable multivibrator 81 is effective in mode set pulse generator to improve the noise resistant properties thereof. Thus, if noise is present at N in the output of amplifier 76, monostable multivibrator will be triggered at the downgoing side or edge of noise N and then retriggered at the downgoing side or edge of the next pulse $P_M$. Accordingly, the output of multivibrator 81 will remain low or negative and will rise or go up only in correspondence to a location $I_d$ from which an index element I' is absent.

An alternative to the use of retriggering type monostable multivibrator 81, as described above, is the circuit shown in FIG. 4, in which pulse $P_M$ is applied simultaneously through a terminal 91 to an input of an AND gate 92 and, through a buffer 93, to the other input of AND gate 92. The second input of AND gate 92 is also connected to a circuit in which a resistor 94 is connected in series with a variable resistor 95 to a voltage source $V_{CC}$ and a capacitor 96 is interposed between ground and the second input of AND gate 92. In the operation of the circuit of FIG. 4, it will be seen that the signal $P_N$ obtained at a terminal 97 connected with the output of AND circuit 92 increases to a high logic level "1" in a specified time $\tau_2$ after the leading edge of pulse $P_M$, and pulses $P_N$ and $P_M$ terminate or go down at the same time (FIG. 7). As a result, even if a noise N having a pulse width shorter than $\tau_2$, is present in pulse $P_M$, such noise does not trigger the circuit and accordingly does not appear in pulse $P_N$. Use of this configuration improves the signal-to-noise ratio.

Referring once again to FIG. 3, it will be seen that pulse $P_N$ from monostable multivibrator 81 is applied to a second monostable multivibrator 82 to obtain an output pulse $P_o$ (FIG. 5H) which rises up when the pulse $P_N$ is going down. The pulse $P_o$ is supplied to still another monostable multivibrator 83 to adjust the phase of the pulse and obtain a pulse $P_Q$ (FIG. 5I) which rises up when the pulse $P_o$ is going down. The pulse width of the pulse $P_o$ is predetermined so that the pulse $P_Q$ extends across the period during which the signal $M_Y$ (FIG. 5M) delivered from the monostable multivibrator 40 of the gate generator 30 is at the high logic level "1". Further, the pulse width of pulse $P_Q$ is selected so that two adjacent periods in which signal $M_Y$ is at the high logic level "1" are not included within the pulse width of the pulse $P_Q$.

The pulse $P_Q$ delivered from the monostable multivibrator 83 is supplied to one input of a NAND gate 84 which, at another input, receives signal $M_Y$ delivered from the monostable multivibrator 40. As a result of the foregoing, NAND gate 84 functions to deliver a negative mode set pulse $P_S$ (FIG. 5) during the period of overlapping of the pulse $P_Q$ and the period in which signal $M_Y$ is at the high logic level "1".

As is apparent from FIGS. 5 and 5J, mode set pulse $P_S$ is obtained at a predetermined position with respect to each location $I_d$ from which index element I' is absent, that is, the mode set pulse $P_S$ is obtained at a position which is spaced by one color phosphor stripe from location $I_d$ where te index element I' is absent.

As described above, mode set pulse $P_S$ is supplied to the preset input PR of JK flip-flop circuit 51 and to the clear inputs CLR of JK flip-flop circuits 52 and 53 of ring counter 50 so as to effect the mode setting operations in the above described manner. In other words, the signals $A_R$, $A_G$ and $A_B$ are controlled such that these signals become "1" in sequence as beam 11 scans the positions of red, green and blue color fluorescent stripes R, G and B as shown in FIGS. 5N, 5O and 5P, respectively, and as a result, gating signals $F_R$, $F_G$ and $F_B$ delivered from gate pulse generator 30 become "1" at the positions of the red, green and blue color fluorescent stripes R, G and B and also at the intermediate positions, as shown in FIGS. 5W, 5X and 5Y, respectively.

As stated hereinbefore, the embodiment of the invention shown in FIG. 3 is capable of reliably detecting each location $I_d$ from which the index phosphor stripe or element I' is absent to obtain a mode set pulse $P_S$ at a given position with respect to that location, and to thereby control the sequence and phase of the gating pulses to determine the modulation of the electron beam by the various primary color signals. The use of the gating pulses in conjunction with the mode set pulse eliminates the previously described disadvantages of the prior art.

In the embodiment shown in FIG. 3, the mode set pulse $P_S$ is formed by initially combining or adding the index signal $S_{IH}$ delivered from the first band pass filter 21 and the signal $S_{IL}$ delivered from the second band pass filter 22. However, the mode set pulse $P_S$ may be formed from signal $S_{IL}$ alone as delivered from the second band pass filter 22.

Figures 2G, 2H:
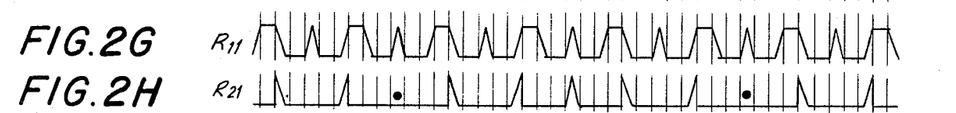
Figure 2I:
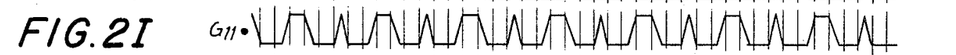
Figure 2J:
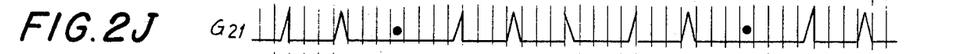
Figure 2K:
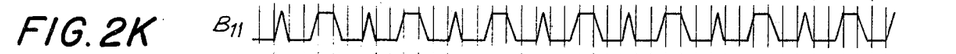
Figure 2L:
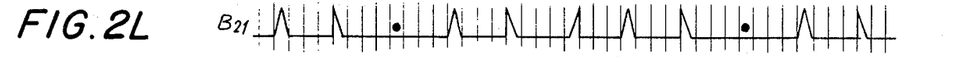
Figure 2M:
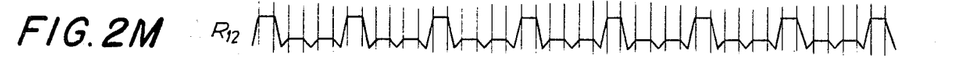
Figure 2N:
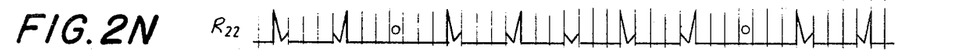
Figure 2P:
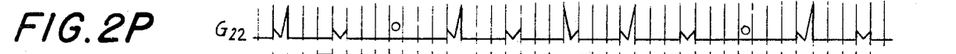
Figure 2Q:
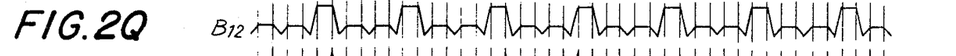
Figure 2R:
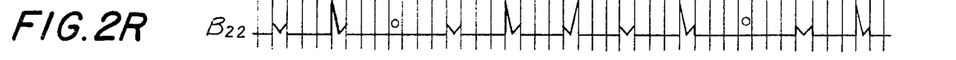

Instead of employing the NAND gates 64, 65 and 66 of FIG. 3 to obtain the auxiliary gating pulses in gating signal $F_R$, $F_G$ and $F_B$, and thereby ensuring the existence of beam current when scanning any location at which an index element I' might be present, for example, as indicated on FIGS. 2G, 2I and 2K, means (not shown) may be provided for providing at least a minimum beam current when the beam scans any one of the color phosphor stripes R, G and B. Thus, in the case of reproducing a red image, the cathode current becomes that shown at $R_{12}$ (FIG. 2M) so that the output signal from the photodetector 20 may be as shown at $R_{22}$ (FIG. 2N). In the case of reproducing or displaying a green image, the cathode current is as shown at $G_{12}$ (FIG. 2O) so that the output signal delivered from photodetector 20 may be as shown at $G_{22}$ (FIG. 2P). In the case of reproducing a blue image, the cathode current is as shown at $B_{12}$ (FIG. 2Q) so that the output signal delivered by photodetector 20 is as indicated at $B_{22}$ (FIG. 2R). In all cases, the signal delivered by photodetector 20 (FIG. 2N, 2P or 2R) reliably includes a pulse for each index element I' and accurately indicates each location $I_d$ from which an index element I' is absent, for example, as represented by the notations o. However, the above-described alternative arrangement, may undesirably degrade the degree of color saturation obtainable with the beam index color television receiver.

In the embodiment of the invention described above with reference to FIGS. 2 and 3, the locations $I_d$ from which index stripes or elements I' are absent are detected to form the mode set signal or pulses $P_S$. However, such mode set signal or pulses can also be developed by otherwise detecting the locations $I_d$, for example, by providing the screen with two different types of index elements or stripes which can be distinguished from each other. For example, as shown on FIG. 8, in a screen $10''a$ of a beam index color cathode ray tube according to another embodiment of this invention, index elements or stripes $I_X$ and $I_Y$ are interspersed at spaced apart locations across the image area of the screen. More particularly, as in the earlier-described embodiment, in FIG. 8, the pitch or lateral distance occupied by each of the triads of red, green and blue color phosphor elements R, G and B is $P_T$, and index phosphor stripes or elements $I_X$ and $I_Y$ extend vertically on the back surface of metallic layer 31 at locations which are spaced horizontally across screen $10''a$. The pitch $P_I$ or the distance between adjacent index phosphor stripes or elements $I_X$ and $I_Y$ is non-integrally different from the pitch $P_T$, for example, is equal to two-thirds of the pitch $P_T$ of each set or triad of color phosphor elements R, G and B. Accordingly, three index elements $I_X$ and $I_Y$ are provided for each two sets of color phosphor elements R, G and B, that is, pitch $P_I$ of adjacent index phosphor stripes I is less than pitch $P_T$ of the sets of color phosphor stripes R, G and B. Furthermore, every sixth one of the index elements is an index element or stripe $I_Y$ and the remaining index elements are constituted by index elements or stripes $I_X$. Thus, the distance between adjacent index elements $I_Y$ is $6P_I = 4P_T$ so that, although the distance $P_I$ between adjacent index elements $I_X$ and $I_Y$ is non-integrally related to the pitch $P_T$ of the triads of color phosphor stripes R, G and B, each of the distinctive index elements or stripes $I_Y$ can be consistently located between green and blue color phosphor stripes G and B, as shown on FIG. 8.

Figure 8:
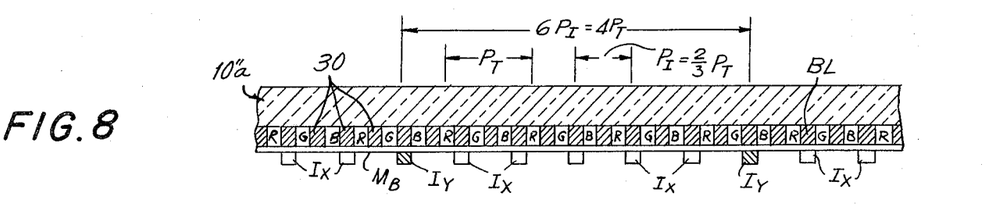
FIG. 8 is a schematic view similar to that of FIG. 5, but showing a portion of the cross-section of the screen of a beam index color cathode ray tube according to yet another embodiment of the present invention.

The index elements or stripes $I_X$ and $I_Y$ may be distinguished from each other by the frequency of the light emitted thereby when excited or scanned by the electron beam. Thus, for example, elements $I_X$ and $I_Y$ can be formed of respective fluorescent materials or phosphors which emit green light and ultra-violet light, respectively, when scanned by the electron beam. In any event, the index elements or stripes $I_Y$, which correspond to the locations $I_d$ in the first-described embodiment, are detected or distinguished from the index elements $I_X$ in order to effect the mode setting operation.

Figure 9:
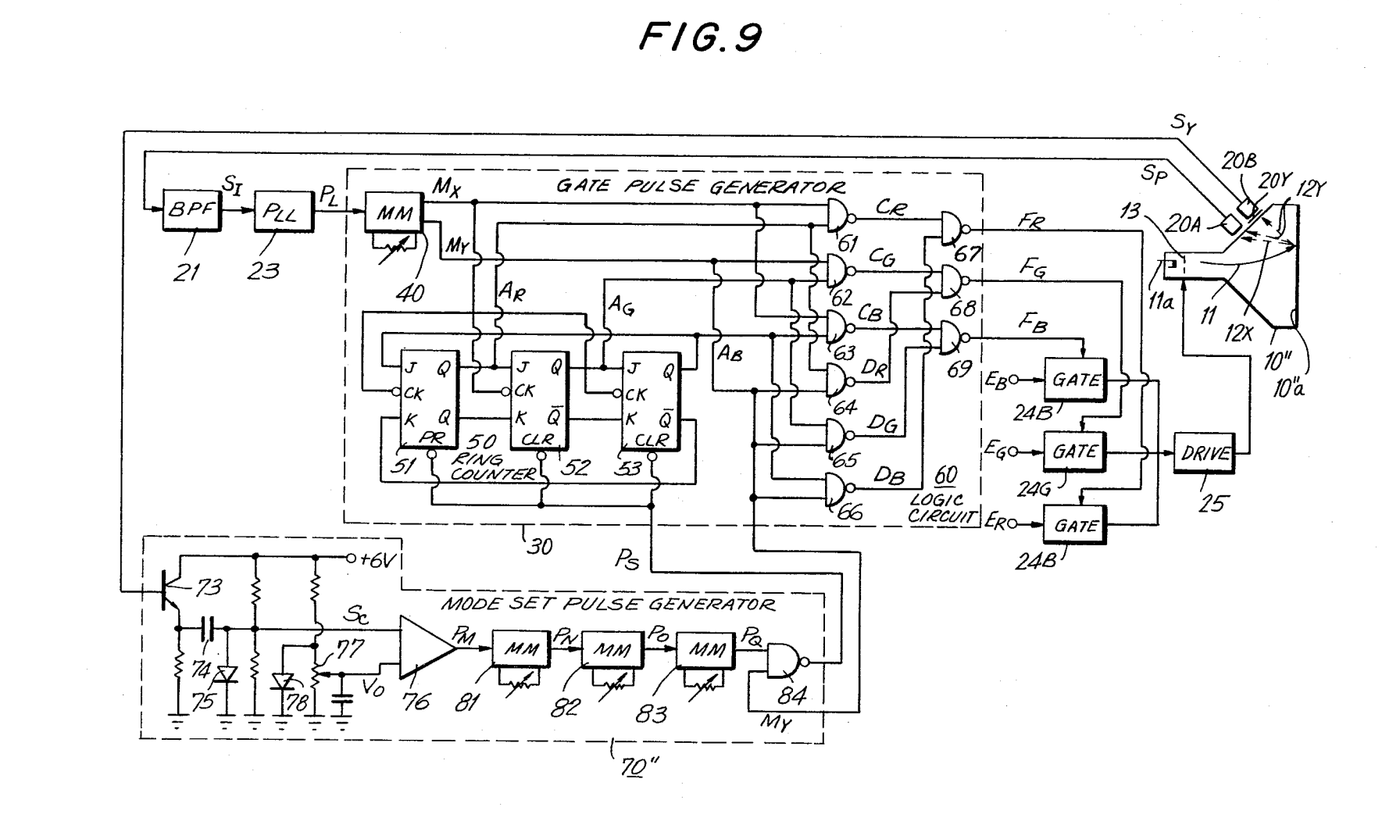
FIG. 9 is a schematic block diagram showing a beam index color television receiver which employs the cathode ray tube of FIG. 8 in conjunction with appropriate circuitry.

FIG. 9 shows a second embodiment of an index beam type color television receiver according to this invention in which elements corresponding to those described above with reference to FIG. 3 are identified by the same reference numerals, and in which reference numeral $10''$ designates a beam index type cathode ray tube having its panel or screen $10''a$ constructed as described above with reference to FIG. 8. The tube $10''$ is provided, at the outside of its funnel-shaped part, with a first photodetector 20A which functions to detect both the light 12X emitted when the electron beam 11 scans each index stripe $I_X$ and the light $12_Y$ emitted when the electron beam 11 scans each index stripe $I_Y$. A filter 20Y is also disposed outside the funnel-shaped part of tube $10''$ and permits the passage of only the ultra-violet light emitted by each index stripe $I_Y$ as the latter is scanned by electron beam 11, and a second photodetector 20B is associated with filter 20Y to detect the light passing therethrough.

Figure 8A:
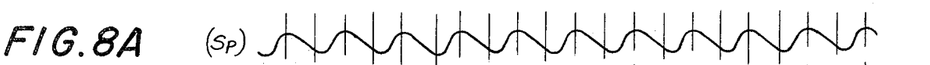
FIGS. 8A through 8Y are wave form diagrams to which reference will be made in explaining the operation of the embodiment shown in FIG. 8.
Figure 8B:
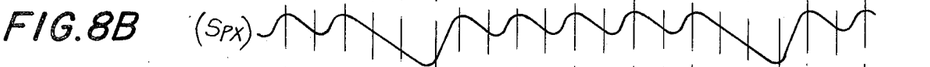
Figure 8C:
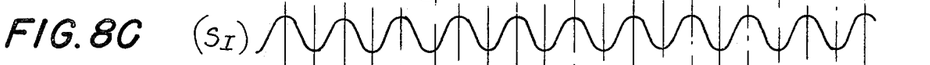
Figure 8D:
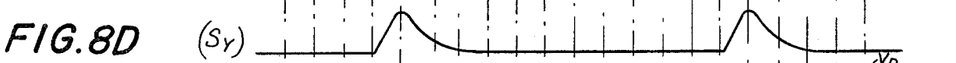
Figure 8E:
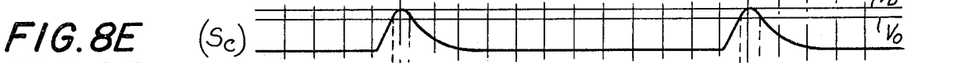
Figure 8F:
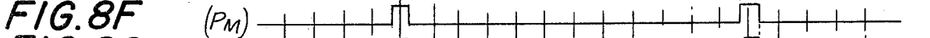
Figure 8G:
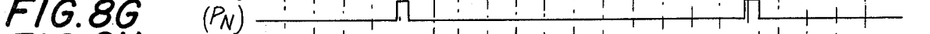
Figure 8H:
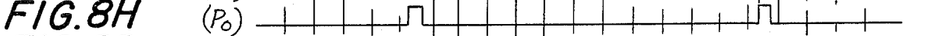
Figure 8I:
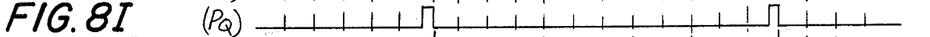

If the red, green and blue color signals are again gated when the beam scans the respective color phosphor stripes R, G and B and also at the locations of the beam intermediate such stripes, for example, as indicated on FIGS. 2G, 2I and 2K, so as to ensure reliable detection of the locations of index stripes $I_Y$ even when a monochrome image is being displayed, then the output signal $S_P$ from photodetector 20A has peaks at the positions where index stripes $I_X$ and $I_Y$ are present, as shown on FIG. 8A, and the output sinal $S_Y$ from photodetector 20B has a peak at each position where an index stripe $I_Y$ is present, as shown on FIG. 8D. The output signal $S_P$ delivered from the photodetector 20A is supplied to band pass filter 21 which functions to obtain therefrom an index signal $S_I$ (FIG. 8C) having a frequency which is one and one-half times the triplet frequency determined by the pitch $P_I$ between adjacent index stripes $I_X$ and $I_X$.

The output signal $S_Y$ obtained from photodetector 20B, and indicating the positions where the index stripes $I_Y$ are present, has a repeating fequency which is equal to one-sixth that of index signal $S_I$ and hence equal to one-quarter the triplet frequency. Such output signal $S_Y$ is supplied directly to a mode set pulse generator 70'' which is similar to the previously described mode set pulse generator 70, but in which the signal $S_Y$ is applied directly to the base of transistor 73 and the resistors 71 and 72 are omitted.

Figure 8J:
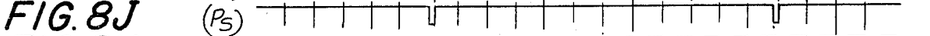
Figure 8K:
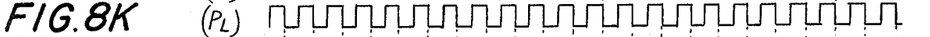
Figure 8L:
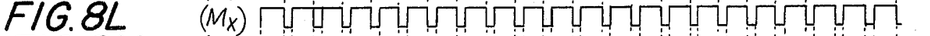
Figure 8M:
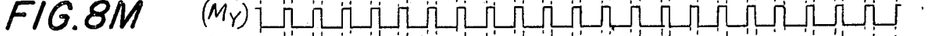

Thus, it will be seen that signal $S_Y$ (FIG. 8D) is similar to signal $S_M$ (FIG. 5D) and is processed similarly to the latter in mode set pulse generator 70'' to provide the mode set pulse $P_S$ (FIG. 8J).

Figure 8N:
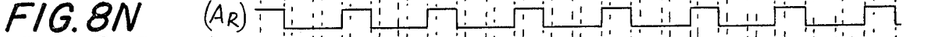
Figure 8P:
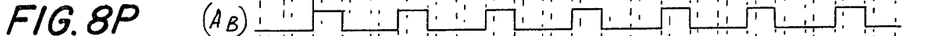
Figure 8Q:
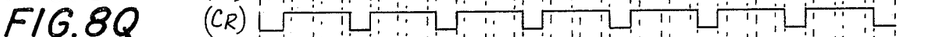
Figure 8R:
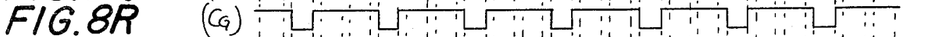
Figure 8S:
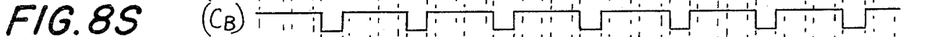
Figure 8T:
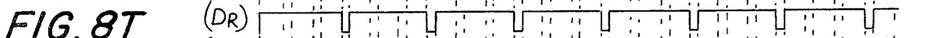
Figure 8U:
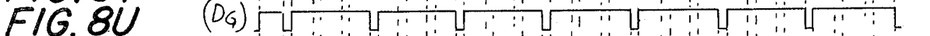
Figure 8V:
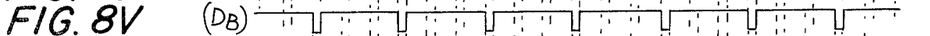
Figure 8W:
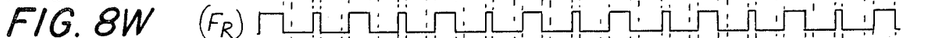
Figure 8X:
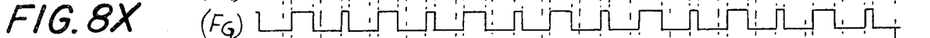
Figure 8Y:
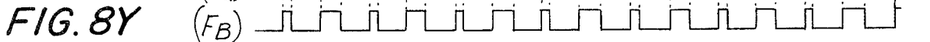

As in the embodiment described above with reference to FIG. 3, the mode set pulse $P_S$ from generator 70'' is applied to the preset input PR of the JK flip-flop circuit 51 and to the clear inputs CLR of the JK flip-flop circuits 52 and 53 of the ring counter 50 of the gate pulse generator 30, so that the signals $A_R$, $A_G$ and $A_B$ therefrom are controlled to become "1" as the beam scans the positions of the red, green and blue color fluorescent stripes R, G and B, as shown in FIGS. 8N, 8O and 8P, respectively. As a result, the gating signals $F_R$, $F_G$ and $F_B$ (FIGS. 8N, 8X and 8Y from the gate pulse generator 30 are controlled to become "1" at the positions of the red, green and blue stripes R, G and B and at the positions midway between these respective color phosphor stripes.

By reason of the foregoing, it will be certain that there will be adequate beam current to ensure the reliable production of the output signal $S_Y$ (from which the mode set pulse $P_S$ is generated) even when a monochrome red image is being displayed and the index elements or stripes $I_Y$ are disposed between green and blue phosphor stripes G and B, as shown on FIG. 8.

Figures 10, 11:
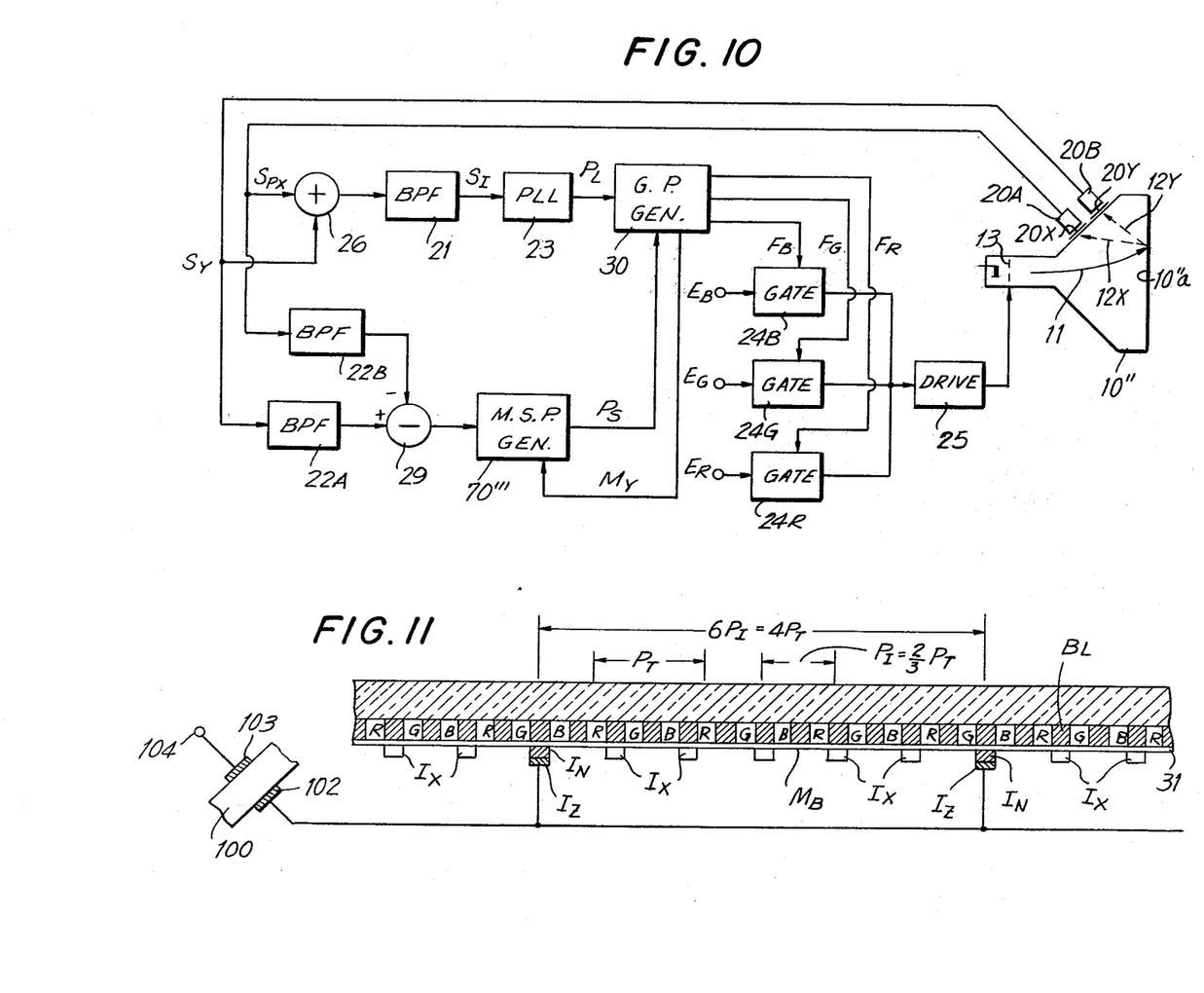
FIG. 10 is a schematic block diagram showing a further embodiment of a beam index color television receiver according to this invention.
FIG. 11 schematically illustrates a portion of the cross-section of the screen of a beam index color cathode ray tube according to a still further embodiment of the invention.

Referring now to FIG. 10, it will be seen that, in another embodiment of a beam index color television receiver according to this invention using the beam index color cathode ray tube 10'' with the arrangement of its screen 10''a as described above with reference to FIG. 8, a filter 20X is associated with photodetector 20A and permits only the light 12X emitted when the electron beam 11 scans the index stripes $I_X$ to pass therethrough to photodetector 20A. In this case, the output signal $S_{PX}$ (FIG. 8B) from the photodetector 20A forms a peak at the position of each index stripe $I_X$ and a valley at the position of each index stripe $I_Y$.

As shown on FIG. 10, output signal $S_{PX}$ from photodetector 20A and output signal $S_Y$ from photodetector 20B are supplied to an adder 26 which adds these output signals. The resulting signal is supplied to a band pass filter 21 to obtain the index signal $S_I$ (FIG. 8C) having its frequency determined by the pitch $P_I$ between adjacent index stripes $I_X$ and $I_Y$.

Simultaneously, the output signal $S_Y$ (FIG. 8D) from photodetector 20B is supplied to a band pass filter 22A so as to obtain a sine wave signal having a frequency which is one-sixth the frequency of index signal $S_I$ and a positive peak at the position of each index stripe $I_Y$. The output signal $S_{PX}$ from photodetector 20A is also supplied to a band pass filter 22B designed to provide a signal which is opposite in phase to the sine wave signal from band pass filter 22A and which also has a frequency which is one-sixth the frequency of index signal $S_I$. These signals delivered from band pass filters 22A, 22B, and which are opposite in phase, are applied to a subtractor 29 which, for example, functions to subtract the output signal of filter 22B from the output signal of filter 22A so as to obtain a signal of large level and excellent ratio S/N. The resulting signal is supplied to mode set pulse generator 70'''.

In the embodiment of FIG. 10, the above-described signal supplied to the mode set pulse generator 70''' is of sine wave configuration so that generator 70''' may function to detect, for example, a zero cross point of the input signal. As a result, it is possible to obtain the mode set pulse $P_S$ at a time which is fixed with respect to the time at which the beam scans the position of each index stripe $I_Y$. Apart from the foregoing, the elements shown on FIG. 10 operate in the same manner as the similarly identified elements in the embodiments of FIGS. 3 and 9.

As shown in FIG. 11, instead of the distinctive index stripes $I_Y$ employed in the embodiments of FIGS. 8, 9 and 10, use may be made of insulator stripes $I_N$ on which are formed respective electrically conductive stripes $I_Z$. In such case, the picture tube 100 is provided, at the inner and outer surfaces of its funnel-shaped part, with electrically conductive layers 102 and 103 coated thereon. All of the electrically conductive stripes $I_Z$, $I_Z$ . . . are connected in common to the inner electrically conductive layer 102, and the outside electrically conductive layer 103 is connected to a terminal 104.

In the arrangement shown schematically on FIG. 11, the scanning of the electrically conductive stripes $I_Z$ by the electron beam causes a variation in the capacity formed between conductive layers 102 and 103. Such varying capacity can be suitably detected by a circuit connected to terminal 104 so as to determine the locations of the stripes $I_Z$ relative to the beam position for establishing a mode set pulse which, as before, can be used to set the mode, or sequence and phase, of gating signals for gating the color signals by which the electron beam is modulated.

In each of the embodiments of this invention described above with reference to FIGS. 3, 9 and 10, the gate pulse generator 70, 70'' or 70''' responds to the application of the inverse signal $M_Y$ from monostable multivibrator 40 and of the outputs $A_R$, $A_G$ and $A_B$ from flip-flops 51, 52 and 53 to NAND gates 64, 65 and 66 to always provide auxiliary gating pulses when the electron beam scans the spaces between color phosphor stripes R, G and B in addition to providing the main gating pulses when the beam scans the color phosphor stripes. In other words, the auxiliary gating pulses are always produced to ensure the reliable generation of the mode set pulse $P_S$ whether or not the latter is needed to set the mode of the gating pulses. Such generation of the auxiliary gating pulses can give rise to degradation of the quality of the displayed picture in that the electron beam may impinge slightly on one of the color phosphor stripes at a time when there is a substantial beam current due to an auxiliary gating pulse.

In accordance with still another embodiment of this invention, the above problem is avoided by producing the mode set pulse during any scanning interval only if a mode setting operation then appears to be necessary. Thus, for example, in the case of a beam index color cathode ray tube of the type in which a run-in area of the screen is conventionally provided with index stripes which are also scanned by the electron beam prior to the scanning of the image or effective picture area of the screen, index pulses resulting from the scanning of such index stripes on the run-in area may be conventionally counted to provide a mode setting operation in response to a predetermined count which occurs at the commencement of the scanning of the image area. Such mode setting at the commencement of the scanning of the image area is maintained or undisturbed throughout the respective scanning interval so long as the index signal is not interrupted, for example, by the displaying of an image or picture having a black area or portion. According, in still another embodiment of this invention, for example, as illustrated on FIG. 12, the mode set pulse $P_s$ and the pulses $D_R$, $D_G$ and $D_B$ which result in the auxiliary gating pulses and may give rise to degradation of the picture or image quality are produced only in the event that there is an interruption in the generation of the index signal which could disturb the initial mode setting effected in a conventional manner during scanning of the run-in area.

More particularly, in the embodiment of the present invention illustrated on FIG. 12, and in which elements corresponding to those previously described with reference to FIG. 2 are identified by the same reference numerals, it is assumed that the beam index color cathods ray tube 10' has the above generally described conventional arrangement for effecting mode setting at the commencement of each scan of the image area of screen 10'a.

Figure 12:
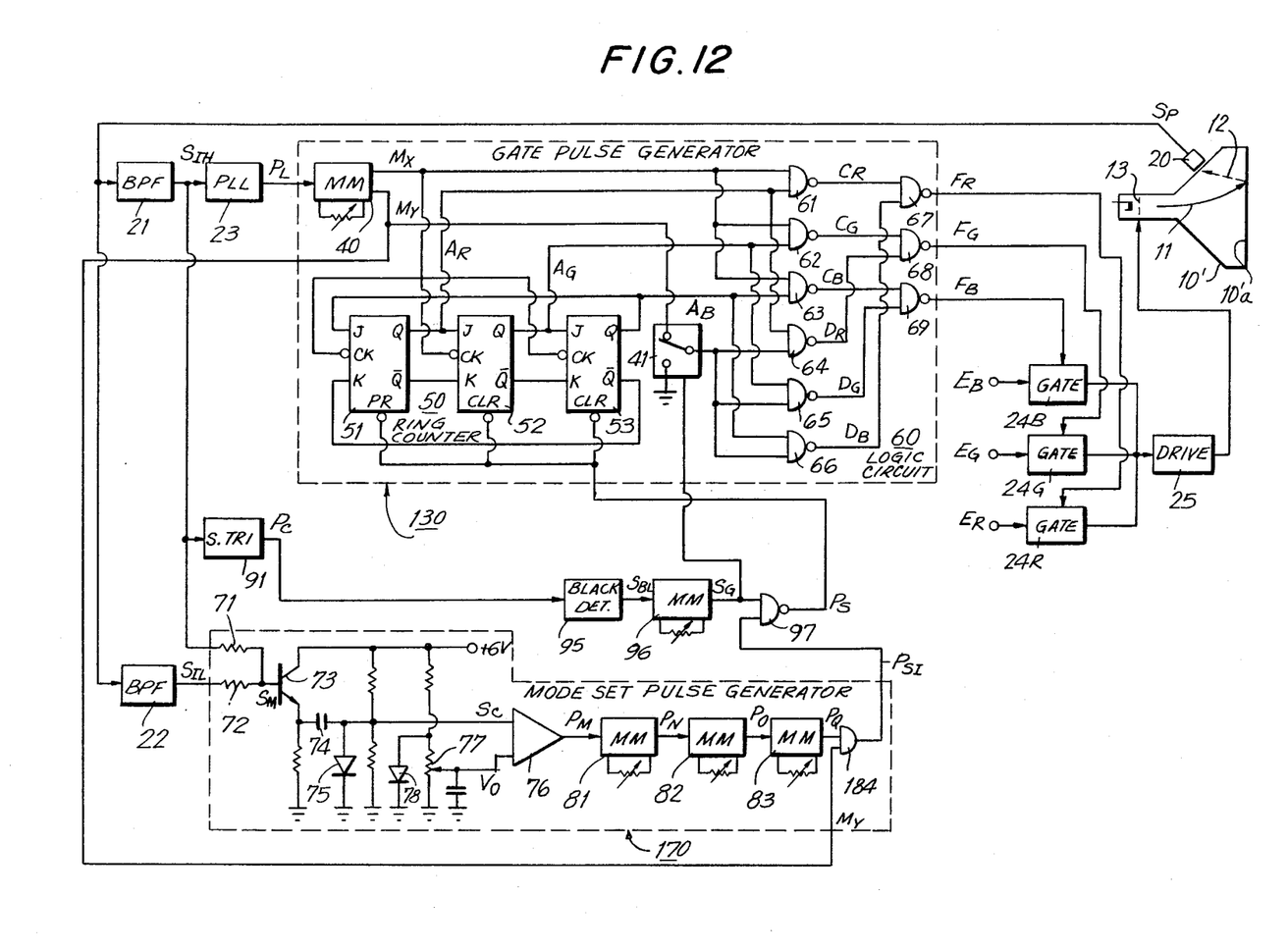
FIG. 12 is a schematic block diagram of still another embodiment of a beam index color television receiver according to this invention employing a cathode ray tube of the type shown on FIGS. 2 and 5.

Further, in the embodiment of FIG. 12, the output signal $S_p$ from photodetector 20 is shown to be supplied to band pass filter 21 from which index signal $S_{IH}$ is derived. Such index signal $S_{IH}$ is supplied to the phase-locked loop (PLL) circuit 23 which, in turn, provides the signal $P_L$ synchronized with the index signal and having a frequency twice that of the latter.

The signal $P_L$ from PLL circuit 23 is shown to be supplied to a gate pulse generator 130 which, in the embodiment of FIG. 12, is shown to comprise a monostable multivibrator 40, a ring counter 50 composed of three stages of JK-flip-flop circuits 51, 52 and 53, and a logic circuit 60 composed of NAND gates 61 to 69, as in the generator 30 of FIG. 3, and, in addition to the foregoing, a switch circuit 41 for determining whether or not the auxiliary gating pulses $D_R$, $D_G$ and $D_B$ are provided from NAND gates 64, 65 and 66.

Figure 13:
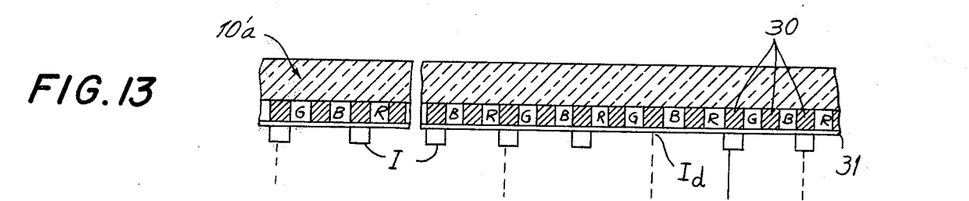
Figure 13A:
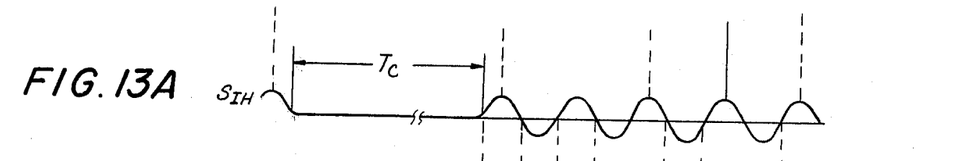
Figure 13B:
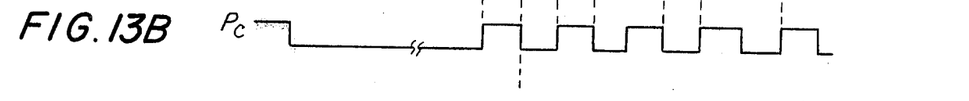

For the purpose of determining whether there is any interruption in the index signal during a scanning interval, the embodiment of FIG. 12 is further shown to comprise a Schmidt trigger circuit 91 which receives the index signal $S_{IH}$ from band pass filter 21 and produces a corresponding index pulse or squarewave signal $P_c$ (FIG. 13B). Such index pulse $P_c$ is applied from Schmidt trigger circuit 91 to a black signal detection circuit 95 which, for example, may be composed of a retrigger-type monostable multivibrator providing an output signal $S_{BL}$ to another monostable multivibrator 96. The output signal $S_G$ (FIG. 13D) from monostable multivibrator 96 is applied, as a change-over or control signal, to the switch circuit 41 in gate pulse generator 130. So long as the index signal $S_{IH}$ is obtained from band pass filter 21 and the index pulse $P_c$ is thus obtained from Schmidt trigger circuit 91, the output signal $S_{BL}$ of black signal detection circuit 95 remains at a low logic level "0" with the result that monostable multivibrator 96 is not triggered and its output signal $S_G$ also remains at a low logic level "0". In response to such low logic level "0" of signal $S_G$, switch circuit 41 is placed in the condition opposite to that shown on FIG. 12, that is, switch circuit 41 has its movable contact engaged with a fixed contact shown to be connected to ground, which is the normal condition of switch circuit 41. Thus, it will be seen that the inverted output $M_Y$ of monostable multivibrator 40 is applied through switch circuit 41 to the respective inputs of NAND gates 64, 65 and 66 only when switch circuit 41 is changed-over from the above-described normal condition to the condition shown on FIG. 12 in response to the output signal $S_G$ of monostable multivibrator 96 being at the high logic level "1".

Further, in the embodiment of FIG. 12, a mode set pulse generator 170, which is otherwise the same as the mode set pulse generator 70 of the embodiment described with reference to FIG. 3, has the NAND circuit 84 of the latter replaced by an AND circuit 184. The output of AND circuit 184 is connected to one input of a NAND circuit 97 which, at another input thereof, receives the output signal $S_G$ from monostable multivibrator 96. Finally, in the embodiment of FIG. 12, the output of NAND circuit 97, which provides the mode set pulse $P_S$, is connected to the preset input PR of flip-flop circuit 51 and to the clear inputs CLR of flip-flop circuits 52 and 53.

Figure 13C:
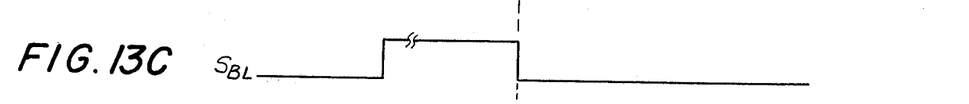
Figure 13D:
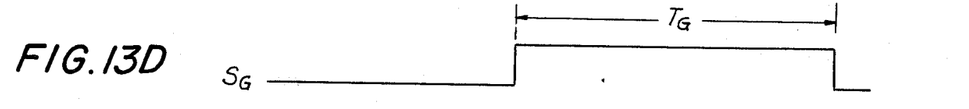
Figure 13E:
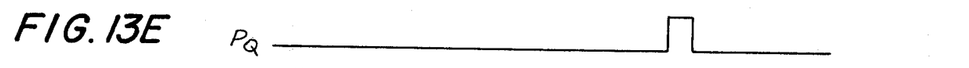
Figure 13F:
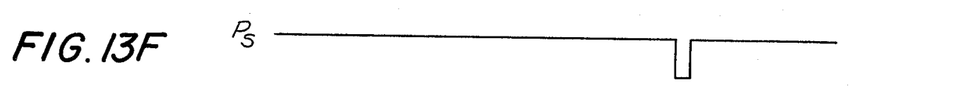

In the following description of operation of the embodiment of the invention shown on FIG. 12, it will be assumed that, at the commencement of the scanning of the image area of screen 10'a, a mode setting operation was suitably performed in a conventional manner. Thereafter, if the video signal becomes black during scanning of a portion of the image area, for example, during the time interval $T_c$ on FIG. 13A, then no beam current flows during such time interval and there is a corresponding interruption in the index signal $S_{IH}$ from band pass filter 21. Thus, the index pulse $P_c$ is also not delivered from Schmidt trigger circuit 91 during the time interval $T_c$ (FIG. 13B) and, as a result thereof, the output signal $S_{BL}$ of the black signal detection circuit 95 is raised to the logic level "1" (FIG. 13C). If the video signal is returned to a level above the black level so that the beam current is restored during the same horizontal scanning period in which the video signal became black, then the index signal $S_{IH}$ and the index pulse $P_c$ are again delivered from band pass filter 21 and Schmidt circuit 91, respectively, as indicated after the time interval $T_c$ on FIGS. 13A and 13B. As a result of the foregoing, the output signal $S_{BL}$ from black signal detection circuit 95 is returned to the low logic level "0". The fall of the output signal $S_{BL}$ from logic level "1" to logic level "0" (FIG. 13C) is effective to trigger monostable multivibrator 96 with the result that the output signal $S_G$ thereof is raised to the high logic level "1" for a predetermined period $T_G$ (FIG. 13D) during which mode setting is effected or restored, as follows:

In response to the increase of the output signal $S_G$ of monostable multivibrator 96 to the high logic level "1", switch circuit 41 of gate pulse generator 130 is changed-over to the condition shown on FIG. 12 for supplying signal $M_Y$ from monostable multivibrator 40 to the respective inputs of NAND gates 64, 65 and 66. With switching circuit 41 thus changed-over to the condition or state illustrated on FIG. 12, gate pulse generator 130 functions in the same manner as gate pulse generator 30 of FIG. 3 to provide auxiliary gating pulses midway between the respective main gating pulses, for example, as shown on FIGS. 5W, 5X and 5Y. Meanwhile, the output signal $P_{s1}$ delivered by mode set pulse generator 170 is supplied to NAND gate circuit 97 which also receives the output signal $S_G$ from black signal detection circuit 95. The mode set pulse $P_s$ (FIG. 13F) can be obtained from NAND circuit 97 only during a period when output signal $S_G$ is at the high logic level "1", that is, only during the predetermined time or period $T_G$ after the restoration of the picture brightness from the black level or beam cut-off condition. The application of the mode set pulse $P_s$ to flip-flop circuits 51, 52 and 53 is then effective to achieve a mode setting operation in the same manner as described above with reference to FIG. 3.

After the mode setting operation has been achieved, output signal $S_G$ from monostable multivibrator 96 returns to the low logic level "0" and, as a result thereof, switch circuit 41 is changed-over to its normal state or condition opposite so that shown on FIG. 12 and in which the movable contact of switch circuit 41 and the respective inputs of NAND circuit 64, 65 and 66 are connected to ground. In such condition of switch circuit 41, the gating signals $F_R$, $F_G$ and $F_B$ consist only of the main gating pulses occurring at the times when the electron beam scans the red, green and blue color phosphor stripes R, G and B, respectively. Thus, the auxiliary gating pulses are only provided when the mode set pulse is needed to be reliably generated for effecting a mode setting operation. So long as a mode setting operation is not required, the auxiliary gating pulses are omitted or suppressed to avoid possible degradation of the quality of the displayed image thereby.

In the embodiment of the invention described above with reference to FIG. 12, the index signal $S_{IH}$ is directly detected for the purpose of determining when the production of such index signal has been interrupted and a mode setting operation will be required. However, the interruption of the index signal $S_{IH}$ may be indirectly detected by detecting the level of the video signal or its respective primary color signals. Furthermore, in the embodiment of the invention shown in FIG. 12, the switch circuit 41 of gate pulse generator 130 may be changed-over to the condition shown in FIG. 12 so as to provide the auxiliary gating pulses only when it is suitably detected that the video signal being received after the interruption of the index signal $S_{IH}$ is a monocolor or monochrome signal, rather than a mixed color or white color signal.

It is also to be appreciated that a beam index color television receiver according to this invention may have its gate pulse generator simply constituted by the flip-flop circuits 51, 52 and 53 of ring counter 50. In that case, the signals $A_R$, $A_G$ and $A_B$ derived at the Q outputs of the flip-flop circuits can be employed as gating signals for gating circuits 24R, 24G and 24B, respectively. In such case, whether the video signal being reproduced after the interruption of the index signal $S_{IH}$ is a monochrome signal or a mixed color or white signal will be detected, and the mode setting operation will be effected only when the reproduced signal of restored brightness is a mixed color or white color signal.

It will be understood that, when switch circuit 41 is in the condition shown on FIG. 12, the gating signals $F_R$, $F_G$ and $F_B$ for gating the red, green and blue color signals will generally have the configuration shown on FIGS. 2G, 2I and 2K. Alternatively, the gating signals applied for gating the primary color signals when switch circuit 41 is in the condition shown on FIG. 12 may generally have the configurations shown on FIGS. 2M, 2O and 2Q and, if desired, such gating signals may be employed only when the video signal being reproduced is a monochrome or monocolor signal.

It is also to be noted that, in beam index color television receivers according to this invention, a matrix circuit may be provided which can add red, green and blue color-difference signals to the luminance signal during a predetermined period after the index signal has been interrupted so as to obtain therefrom the red, green and blue primary color signals, and the respective color-difference signals may be interrupted to derive the luminance signal instead of the primary color signals. The luminance signal thus obtained may be supplied to the cathode ray tube for ensuring an adequate beam current during the production of the mode set pulse. Alternatively, instead of the changed-over primary color signals for obtaining the necessary beam current, a constant direct current voltage may be derived and supplied to the electrode 13 of the beam index color cathode ray tube for ensuring an adequate beam current for accurately detecting the locations of the distinctive index stripes or the locations from which index stripes are absent.

The embodiment of FIG. 12 has been described as employing a color cathode ray tube with its screen 10'a having the configuration described with reference to FIG. 2, but it will be appreciated that such embodiment can also be employed with a cathode ray tube screen of the type described above with reference to FIG. 8 or FIG. 11.

The various embodiments of this invention have been described above as employing an arrangement of index stripes or elements having a distance $P_I$ therebetween which is two-thirds the pitch $P_T$ of the triads of color phosphor stripes. However, it is only necessary that the distance $P_I$ be non-integrally different from the pitch $P_T$. Moreover, the locations $I_d$ from which the index stripes are absent, in the case of the embodiment of FIG. 2, or the locations of the distinctive stripes $I_Y$ have been described as being spaced apart by six times the distance $P_I$, that is, four times the pitch $P_T$. However, it is only necessary that such distance between the adjacent locations $I_d$ or the stripes $I_Y$ be an integral multiple of the pitch $P_T$.

It is also to be noted that the invention may be applied to any beam index color cathode ray tube, and not merely to color television receivers.

By way of summary, it will be noted that all of the described embodiments of this invention are capable of detecting the locations from which the index stripes are absent, as at $I_d$, or the locations where the distinctive index stripes $I_y$ are present, so as to obtain mode setting pulses in a predetermined relation to such locations, and thereafter controlling the sequence and phase of the gating signals for the respective primary color signals by means of such mode set pulses. As a result of the foregoing, it is possible to precisely restore the proper mode of the color gating signals after the video signal has become black so as to interrupt the beam current and produce a corresponding interruption in the index signal. Since the present invention does not require that the beam current be prevented from decreasing to the black level, reduction of the contrast of the displayed image is avoided.

Having described several illustrative embodiments of this invention and specific modifications thereof with reference to the accompanying drawings, it is to be understood that the invention is not limited to those precise embodiments and modifications, and that various other changes and modifications may be effected therein by one skilled in the art without departing from the scope or spirit of the invention, as defined in the appended claims.

What is claimed is:

1. A color television receiver of the beam index type comprising:

a cathode ray tube having a screen composed of groups of color phosphor elements arranged side-by-side to have a predetermined pitch in a repetitive pattern across an image area of the screen with each of said color phosphor elements of each group emitting light of a respective color different from the color of light emitted by each of the other elements of the respective group when excited by an electron beam, and gun means providing an electron beam scanning across said screen during scanning intervals to excite said color phosphor elements in succession and adapted to modulate the density of said electron beam in accordance with a received color signal;

means responsive to said electron beam scanning across said screen to provide index and mode set signals at respective locations of said beam on said screen which are interspersed across the latter with said locations being uniformly spaced from each other by a distance non-integrally different from said predetermined pitch and with adjacent locations corresponding to said mode set signal being spaced apart by an integral multiple of said pitch;

gating means receiving color signals corresponding to said color phosphor elements, respectively, and being controllable for determining which of said color signals is received by said gun means for modulating said electron beam;

gate pulse generating means responsive to said index signal for providing sequentially repeated gating signals to said gating means at a frequency corresponding to that with which said beam scans said groups of color phosphor elements; and mode set means responsive to said mode set signal to control the phase and sequence of said gating signals.

2. A color television receiver of the beam index type according to claim 1; in which said means to provide the index and mode set signals includes index elements disposed on the screen at said locations corresponding to the index signal and being absent from the screen at said locations corresponding to said mode set signal, said index elements being excited by said electron beam scanning the respective locations to emit radiant energy, detecting means responsive to said radiant energy to provide a detected output having level peaks corresponding to the scanning by said beam of said locations at which the index elements are disposed and level depressions corresponding to said locations from which the index elements are absent, means responsive to said level peaks to provide said index signal, and means responsive to said level depressions to provide said mode set signal.

3. A color television receiver of the beam index type according to claim 2; in which said means responsive to said level peaks includes band pass filter means receiving said detected output and being of high Q to eliminate said level depressions from said index signal; and said means responsive to said level depressions to provide said mode set signal includes band pass filter means of low Q also receiving said detected output to provide an inverted output with large level peaks in correspondence to said level depressions and decreased levels corresponding to said level peaks of the detected output, and means for combining said the outputs of said band pass filter means of high Q and low Q, respectively, to result in said mode set signal constituted by pulses derived from said large level peaks.

4. A color television receiver of the beam index type according to claim 1; in which said means to provide the index and mode set signals includes index elements disposed on said screen at said locations corresponding to the index signal and being absent from the screen at said locations corresponding to the mode set signal, said index elements being excited by said electron beam scanning the respective locations to emit radiant energy, detecting means detecting the emitting of radiant energy by said index elements and the absence of said energy when said beam scans the locations corresponding to said index and mode set signals, respectively, and means connected with said detecting means for providing said index signal and said mode set signal in response to the detection of said emitting of radiant energy and said absence of said energy, respectively.

5. A color television receiver of the beam index type according to claim 4; in which said color phosphor elements have spaces therebetween, and said locations of the index elements and said locations from which the index elements are absent are arranged at respective ones of said spaces; and in which said gate pulse generating means includes means for generating sequences of main gating pulses corresponding to said color signals, respectively, and intended to occur as said beam scans the respective color phosphor elements, and means generating sequences of auxiliary gating pulses respectively corresponding to said sequences of main gating pulses and occurring intermediate the latter to avoid false generation of said mode set signal at a time when said color signals correspond to a monochrome image.

6. A color television receiver of the beam index type according to claim 1; in which said means to provide the index and mode set signals includes index elements and mode set elements disposed on said screen at the locations corresponding to said index signal and said mode set signal, respectively, said index and mode set elements being excited by said electron beam when the latter scans the respective locations to emit characteristic radiations which are distinguishable from each other, and detecting means for separately detecting said characteristic radiations emitted by said index and mode set elements, respectively.

7. A color television receiver of the beam index type according to claim 6; in which said characteristic radiations are light radiations of different frequencies, respectively, and said detecting means includes first and second photodetectors disposed to receive light radiations from said index and mode set elements, and filter means associated with one of said detectors for permitting said one detector to respond to only light radiation from said mode set elements.

8. A color television receiver of the beam index type according to claim 6; in which said characteristic radiations are light radiations of different frequencies, respectively; and said detecting means includes first and second photodetectors, and first and second filters through which only the light radiations from said index elements and said mode set elements, respectively, are transmitted to said first and second photodetectors.

9. A color television receiver of the beam index type according to claim 8; in which said means to provide said index and mode set signals further includes adder means for adding outputs of said first and second photodetectors to provide said index signal, and subtracting means subtracting the output of said second photodetector from the output of said first photodetector so as to obtain said mode set signal.

10. A color television receiver of the beam index type according to claim 1; in which said means to provide the index and mode set signals includes index elements on said screen at said locations corresponding to the index signal and being excited by said electron beam scanning the respective locations to emit radiant energy, means detecting said radiant energy to provide said index signal in response thereto, insulating elements on said screen at said locations corresponding to said mode set signal, electrically conductive elements on said insulating elements and adapted to be scanned by said beam, conductive layers on the inner and outer surfaces of said cathode ray tube, and means connecting all of said conductive elements to said layer on said inner surface so that said mode set signal may be derived from variations in the capacity between said layers.

11. A color television receiver of the beam index type according to claim 1; further comprising means responsive to said index signal to provide an indication of the absence thereof due to the color signal received by said gun means being at a black level during one of said scanning intervals, and means responsive to said indication of the absence of said index signal due to said black level to cause operation of said mode set means in response to said mode set signal upon restoration of said color signal received by said gun means to a level higher than said black level.

12. A color television receiver of the beam index type according to claim 11; in which said means to provide the index and mode set signals include index elements disposed on said screen at said locations corresponding to the index signal and being absent from the screen at said locations corresponding to the mode set signal, said index elements being excited by said electron beam scanning the respective locations to emit radiant energy, detecting means detecting the emitting of radiant energy by said index elements and the absence of said energy when said electron beam scans the locations corresponding to said index and mode set signals, respectively, and means connected with said detecting means for providing said index signal and said mode set signal in response to the detecting of the emitting of said energy and the absence thereof, respectively.

13. A color television receiver of the beam index type according to claim 12; in which said color phosphor elements have spaces therebetween, and said locations of the index elements and said locations from which the index elements are absent are arranged at respective ones of said spaces; and in which said gate pulse generating means includes means for generating sequences of main gating pulses corresponding to said color signals, respectively, and intended to occur as said beam scans the respective color phosphor elements, and means operative upon said restoration of the color signal to a level higher than the black level for generating sequences of auxiliary gating pulses which are applied to said gating means and which respectively correspond to said sequences of the main gating pulses and occur intermediate the latter to avoid false generation of said mode set signal.

14. A color television receiver of the beam index type according to claim 1; further comprising means for interrupting operation of said mode set means by said mode set signal so long as said sequentially repeated gating signals are synchronized with the scanning of the corresponding color phosphor elements by said beam during said scanning intervals.

15. A color television receiver of the beam index type according to claim 1; in which said integral multiple of said distance is selected so that each of said locations corresponding to said mode set signal will be in a predetermined position to the same color phosphor element of an adjacent one of said groups of color phosphor elements.

16. A color television receiver of the beam index type according to claim 15; in which each of said groups includes three different primary color phosphor elements, said distance is two-thirds said pitch of the groups, and said adjacent locations corresponding to the mode set signal are spaced apart by six times said distance.

* * * * *